United States Patent [19]

Pafford

[11] Patent Number: 4,828,348
[45] Date of Patent: May 9, 1989

[54] FIBER OPTIC TELESCOPE

[76] Inventor: Thomas L. Pafford, 12404 Harbor Dr., Woodbridge, Va. 22192

[21] Appl. No.: 889,223

[22] Filed: Jul. 25, 1986

[51] Int. Cl.$^4$ ............................................. G02B 6/00
[52] U.S. Cl. ............................... 350/96.10; 350/96.24; 350/96.25; 350/96.26; 350/174; 350/537; 350/557
[58] Field of Search ............... 350/96.24, 96.25, 96.26, 350/96.15, 96.16, 96.20, 96.21, 96.22, 96.1, 537, 557, 169, 174

[56] References Cited

U.S. PATENT DOCUMENTS

| | | | |
|---|---|---|---|
| 3,666,346 | 5/1972 | Lucas | 350/96.25 |
| 3,990,779 | 11/1976 | McCartney | 350/96.21 |
| 4,000,419 | 12/1976 | Crost et al. | 350/96.25 X |
| 4,130,345 | 12/1978 | Doellner | 350/96.22 |
| 4,193,661 | 3/1980 | dAuria et al. | 350/96.16 |
| 4,423,923 | 1/1984 | Frazier et al. | 350/96.15 |
| 4,432,603 | 2/1984 | Morency et al. | 350/96.21 |
| 4,433,896 | 2/1984 | Frazier | 350/96.21 |
| 4,435,038 | 3/1984 | Soes et al. | 350/96.21 |
| 4,465,335 | 8/1984 | Eppes | 350/96.21 |
| 4,483,311 | 11/1984 | Whitaker | 350/96.25 X |
| 4,487,646 | 12/1984 | Murray et al. | 350/96.25 X |
| 4,611,885 | 9/1986 | Boirat | 350/96.20 |
| 4,641,912 | 2/1987 | Goldenberg | 350/96.10 |
| 4,647,149 | 3/1987 | McCartney et al. | 350/96.20 |
| 4,650,279 | 3/1987 | Magee | 350/96.24 |

FOREIGN PATENT DOCUMENTS

| | | | |
|---|---|---|---|
| 1942971 | 2/1970 | Fed. Rep. of Germany | 350/515 |
| 2504819 | 8/1976 | Fed. Rep. of Germany | 350/96.21 |
| 2563016 | 10/1985 | France | 350/537 |
| 60-041006 | 3/1985 | Japan | 350/537 |
| 2084347 | 4/1982 | United Kingdom | 350/537 |

OTHER PUBLICATIONS

Balliet et al., IBM Technical Disclosure Bull., vol. 24, No. 12, May 1982, "Single Element Fiber-Optic to Fiber-Optic Coupler", pp. 6331-6332.

Primary Examiner—William L. Sikes
Assistant Examiner—Frank González
Attorney, Agent, or Firm—Kerkam, Stowell, Kondracki & Clarke

[57] ABSTRACT

Disclosed is a fiber optic telescope composed of at least one fiber optic telescopic cell. The fiber optic cell is composed of a refracted light conveyor and a reflected light retriever. The refracted light conveyor is comprised of a lens, a cone, a dual diametered fiber optic cable, a fiber optic connector, a last fiber optic cable, and an eyepiece or other suitable light receiving apparatus. The reflected light retriever is comprised of six fiber optic cables, two fiber optic connectors, and two secondary fiber optic cables. The refracted light conveyor and the reflected light retriever are held together by a holder, an adjuster, and a washer. The fiber optic telescope overcomes problems associated with the propagation of light in a telescope: reflection, refraction, image formulation and magnification. Additionally the fiber optic telescope is capable of propagating solar light with an efficiency of 95%.

2 Claims, 7 Drawing Sheets

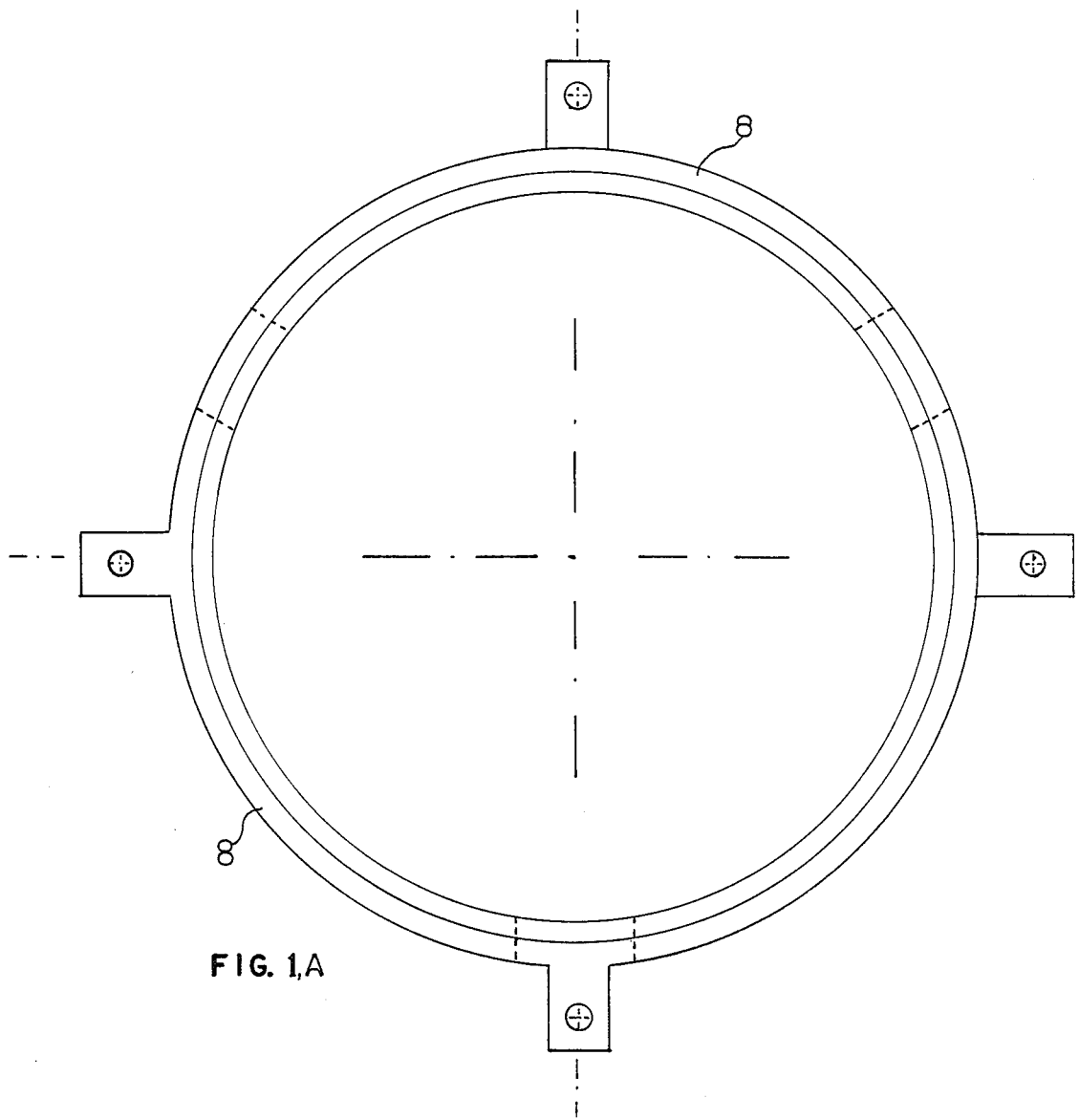
FIG. 1,A

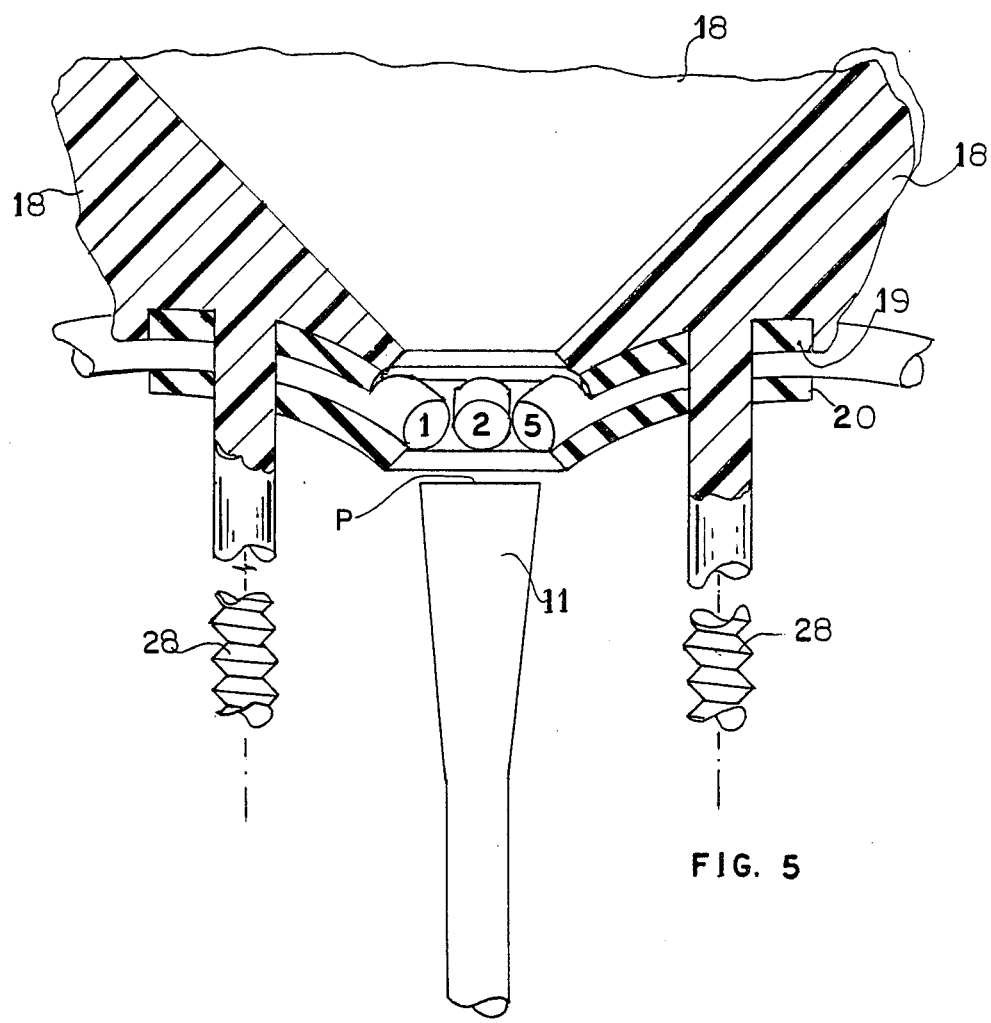
FIG. 5
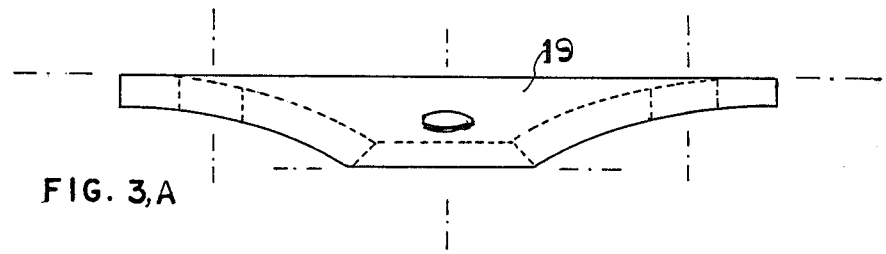
FIG. 3,A

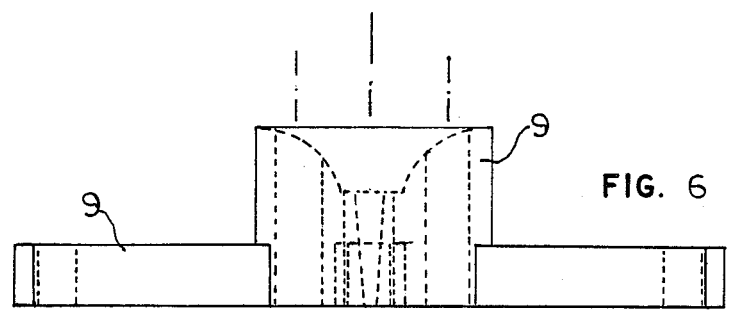
FIG. 6
FIG. 7
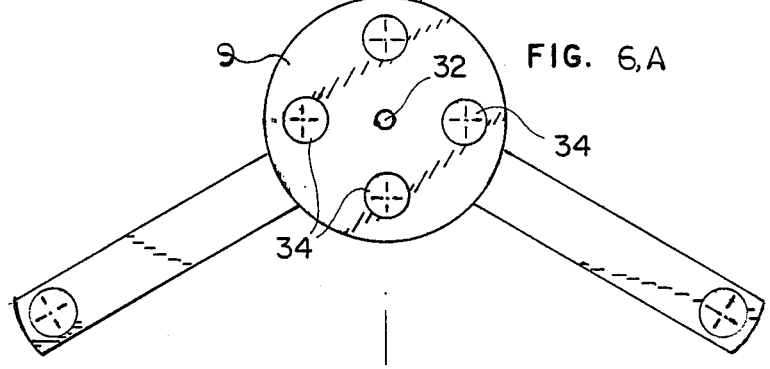
FIG. 6,A
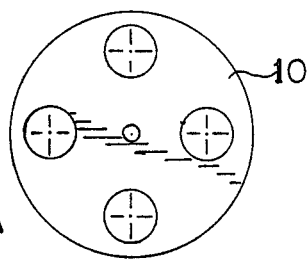
FIG. 7,A

FIBER OPTIC TELESCOPE

CROSS REFERENCE TO RELATED APPLICATIONS

This application is related to U.S. patent application Ser. No. 06/868,539, filed May 30, 1986, which is hereby incorporated by reference.

FIELD OF THE INVENTION

The present invention relates generally to fiber optics, and more particularly to a telescope that applies fiber optic technology to reduce or eliminate the problems associated with light propagation in a telescope. The present invention further relates to a fiber optic telescope that applies fiber optic technology to the problems of efficiency in a solar collector.

SUMMARY OF THE INVENTION

Astronomy applies technology to propagate light in a telescope. Problems associated with the telescopes of the prior art have included reflection, refraction, image formation, magnification and the like. The fiber optic telescope of the present invention utilizes fiber optic technology to reduce or eliminate problems associated with these prior art telescopes.

The fiber optic telescope of the present invention consists of at least one fiber optic telescopic cell. As light passes through the fiber optic telescopic cell it is converged to a point where the major portion of the light is refracted into a dual diametered fiber optic cable. This refracted light is transmitted through the dual diametered fiber optic cable. The remaining portion of the light is reflected to other fiber optic cables where it is transmitted to a fiber optic connector which merges the reflected light. This merged reflected light is transmitted to a second fiber optic connector where it is merged with the light from the dual diametered fiber optic cable.

Image formation in the fiber optic telescope is achieved by regulating the lengths of the various fiber optic cables. Magnification is produced by providing in the eyepiece, or the light receiving means, an image having a smaller size than the actual object size so that the ratio of image size to object size causes magnification.

The fiber optic technology used in the fiber optic telescope of the present invention can also be used in a solar light collector to increase efficiency to above 95%.

BRIEF DESCRIPTION OF THE DRAWINGS

The present invention will be described with reference to the accompanying figures, wherein:

FIG. 1A is a top view of the holder depicted in FIG. 1.

FIG. 3A is a front view of the mat depicted in FIG. 3.

FIG. 5 is a section view of the cone, two mats, the large end of the dual diametered fiber optic cable, and three of the six fiber optic cables situated in a circle, above, and tilted at an angle towards the large end of the dual diametered fiber optic cable.

FIG. 6 is a section view of the adjuster wherein each hole in the adjuster has a larger diameter than each of the cone's four screws allowing movement of the adjuster.

FIG. 6A is a top view of the adjuster depicted in FIG. 6.

FIG. 7 is a side view of the washer used to hold the cone to the adjuster.

FIG. 7A is a top view of the washer depicted in FIG. 7.

DETAILED DESCRIPTION

The fiber optic telescope of the present invention consists of at least one fiber optic telescopic cell. This fiber optic telescopic cell is composed of a refracted light conveyor and a reflected light retriever held together by a holder or other means.

The refracted light conveyor consists of a lens, a cone, a dual diametered fiber optic cable, a fiber optic connector, at least one fiber optic cable, and an eyepiece or other light receiving means.

The reflected light retriever consists of fiber optic cables positioned to receive the light reflected from the dual diametered fiber optic cable. For example, the reflected light retriever may be composed of six fiber optic cables, situated in a circle, above, and tilted at an angle towards the large end of the dual diametered fiber optic cable, two fiber optic connectors, and two secondary fiber optic cables.

Figure 1:
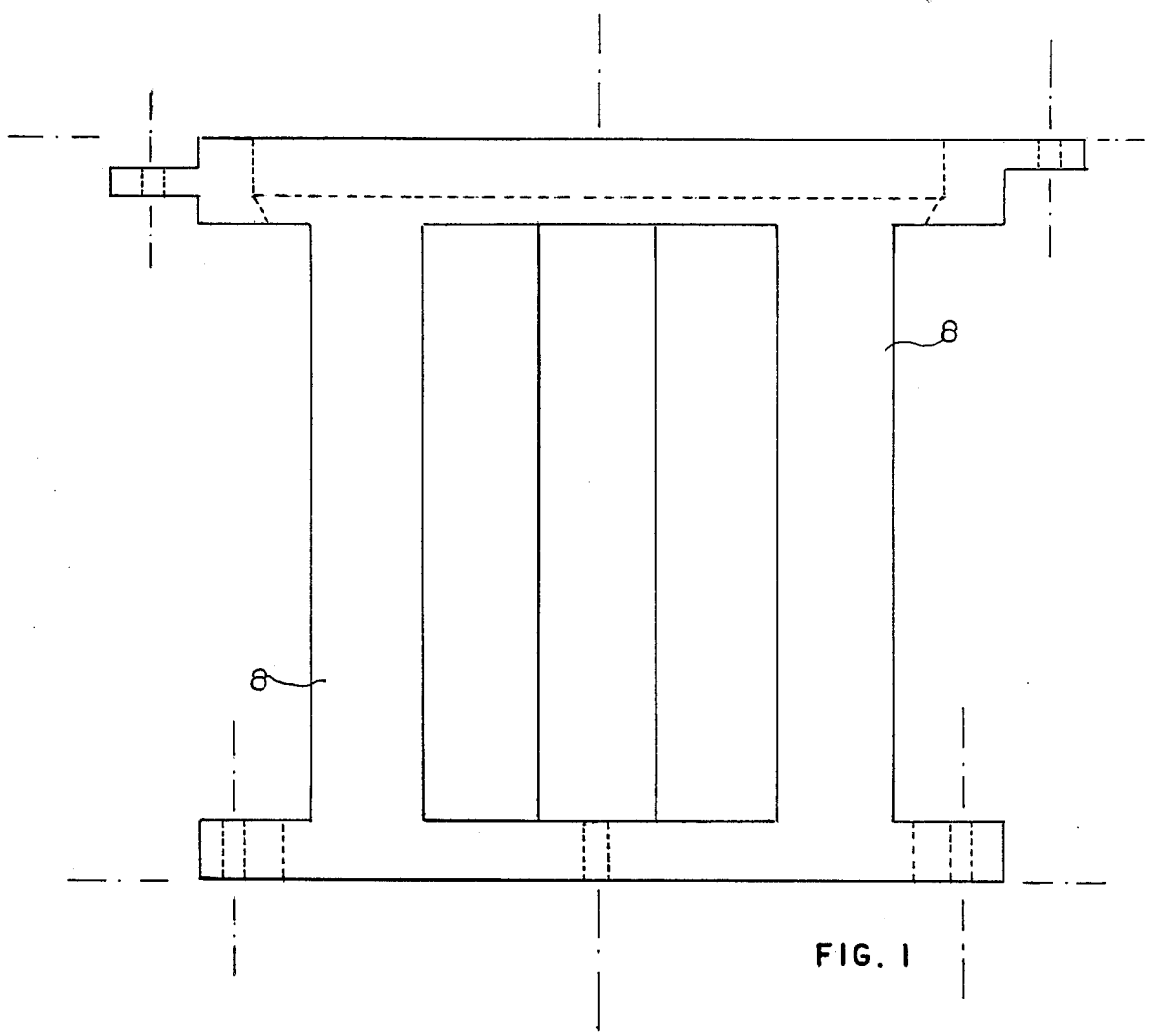
FIG. 1 is a side view of the holder of the present invention used to hold together the components of the fiber optic telescopic cell, the refracted light conveyor and the reflected light retriever.

The refracted light conveyor and the reflected light retriever are held together by any means such as the holder, adjuster and washer depicted in the drawings. The holder is depicted in FIGS. 1 and 1A and may be made of plastic or other suitable material.

Figure 2:
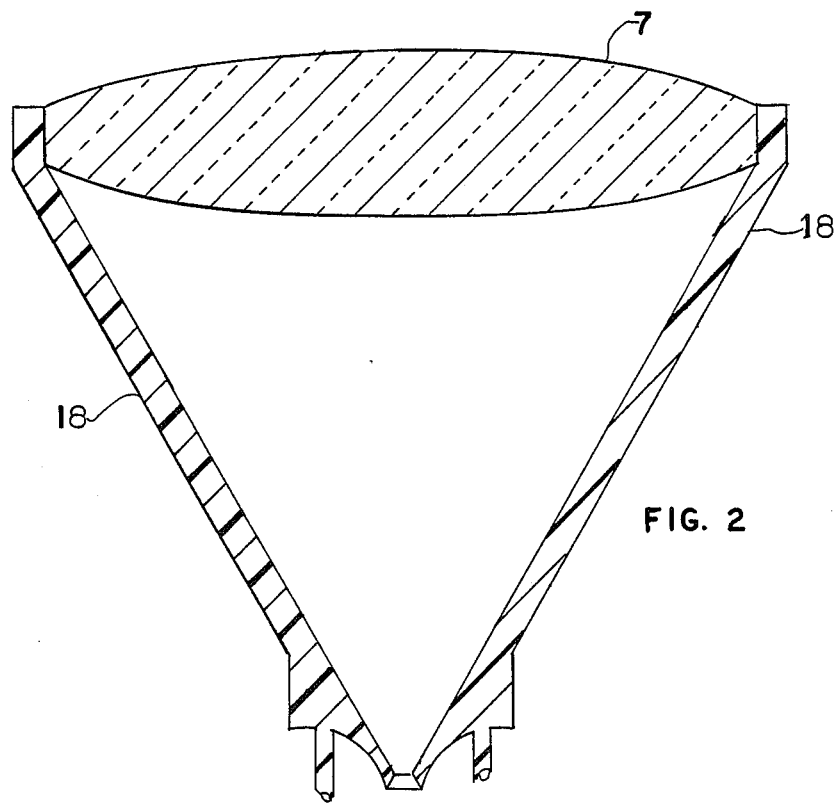
FIG. 2 is a section view of the cone and lens, components of the refracted light conveyor.

FIG. 2 shows the lens 7, which may be made of glass or other suitable material, attached to the cone 18. At the bottom of the cone are shown two of the four screws that are made as part of the cone and extended from the cone. The cone helps hold the lens in place and keeps dirt, dust, and moisture out of the path of the light passing between the lens and the large end of the dual diametered fiber optic cable.

Figure 3:
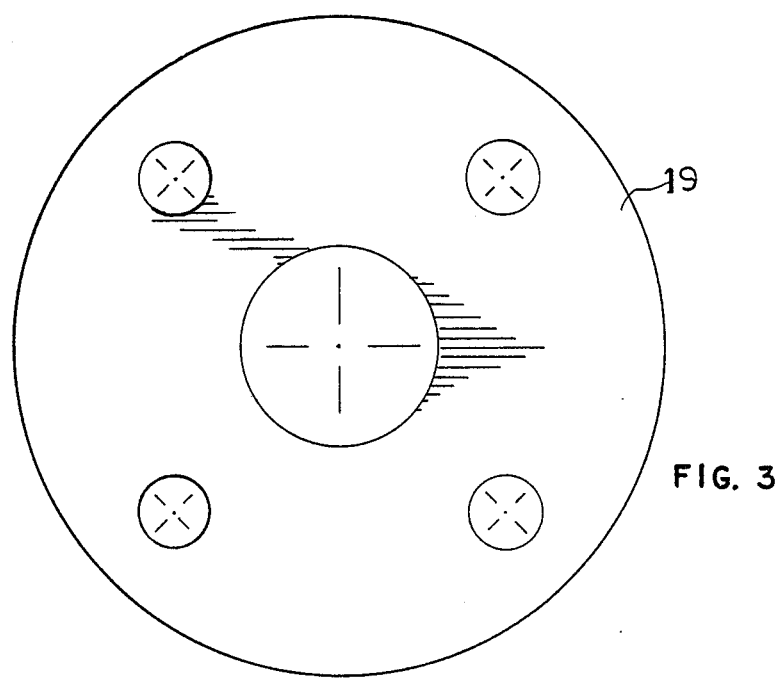
FIG. 3 is a top view of the mat.

FIGS. 3 and 3A show views of mat 19. Mat 19 may be composed of rubber or other suitable material. The center hole in the mat permits the light to pass through and converge at point P. The four other holes depicted in mat 19 are to allow the four screws extending from the cone to pass through.

Figure 4:
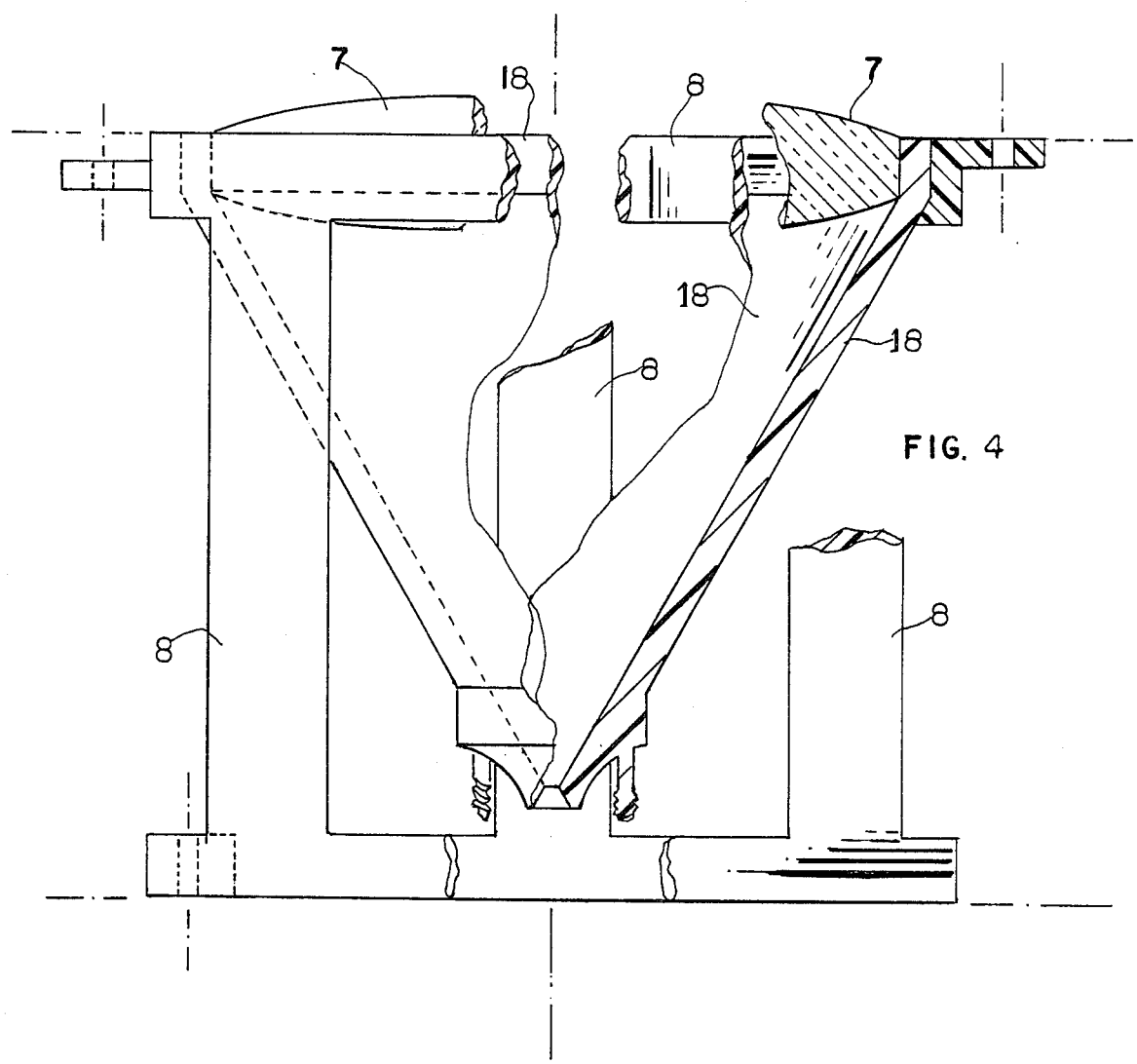
FIG. 4 is a section view of the cone and the lens being held by the holder.

FIG. 4 is a view of lens 7 attached to cone 18, setting in holder 8. FIG. 5 depicts the bottom of cone 18. Mats 19 and 20 are shown below cone 18. Between mats 19 and 20 are located three of the six fiber optic cables; cables 1, 2, and 5. FIG. 5 also shows a view of the large end of dual diametered fiber optic cable 11, located at point P. Also shown are two of the cone's four extending screws, 20.

FIGS. 6 and 6A are views of adjuster 9 having adjuster alignment legs 9'. Located in the center of the adjuster is a hole 34 for the large end of the dual diametered fiber optic cable. Also shown are the holes 34 for the cone's extending screws. Each of these four holes is larger in diameter than each of the cone's extending screws. This allows for movement of the adjuster to center the large end of the dual diametered fiber optic cable exactly at point P. FIG. 7 is a view of washer 10. The center hole of the washer is for the dual diametered fiber optic cable. The other four holes in the washer are for the cone's extending screws.

Figure 8:
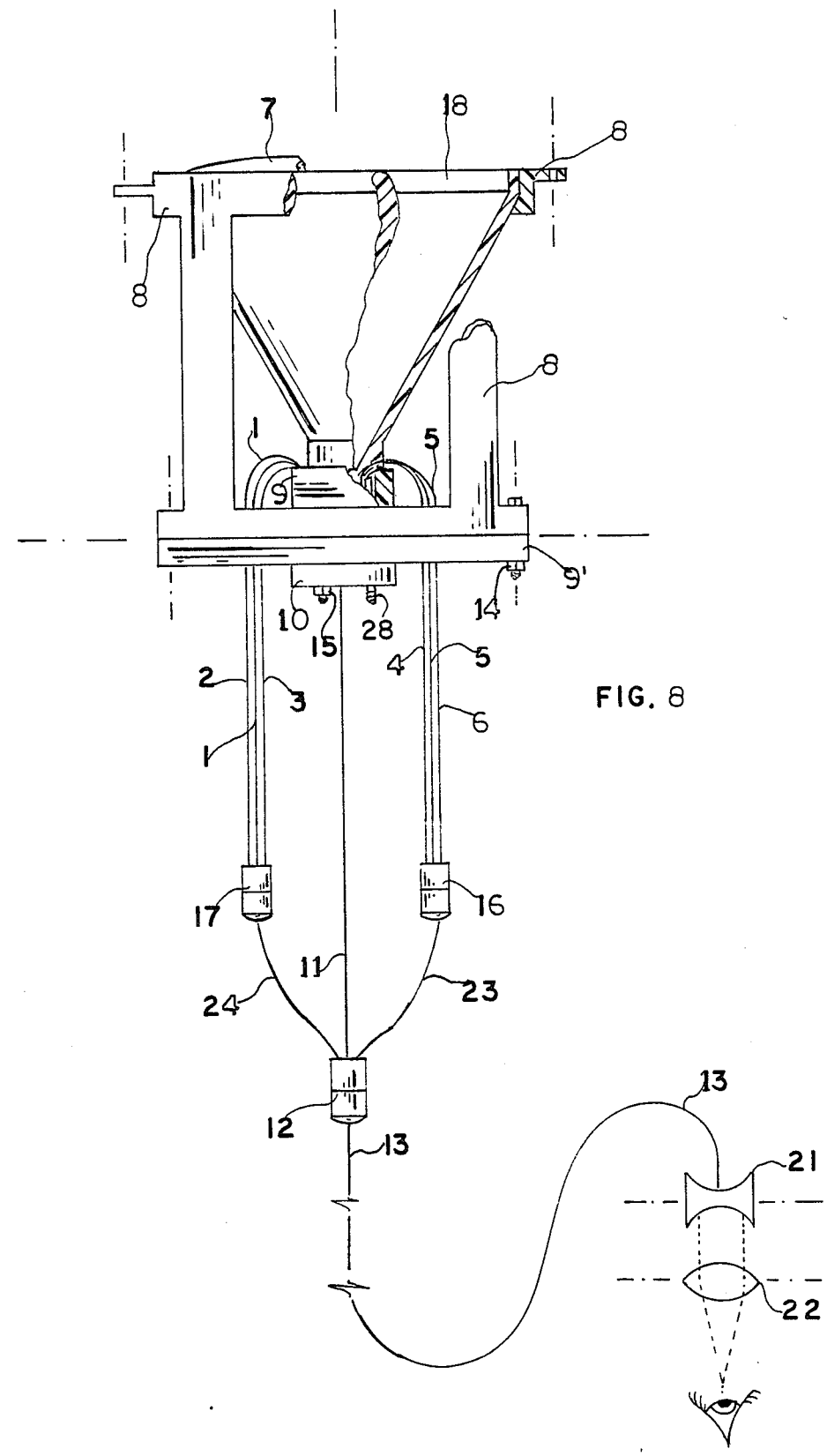
FIG. 8 is a view of the fiber optic telescopic cell showing the component parts.

FIG. 8 is a view of the fiber optic telescopic cell showing lens 7 attached to cone 18 and set in holder 8. At the bottom of the holder is adjuster alignment legs 9' attached to holder 8 by any suitable means such as nut and bolt 14. Washer 10 is attached to adjuster 9. Washer 10 holds the cone to the adjuster 9 by means of a nut 15, which in turn is attached to the cone's extending screws, 28. The six fiber optic cables; 1, 2, 3, 4, 5, and 6, can be seen coming out from between the bottom of the cone and the top of the adjuster. Three of the six fiber optic cables; 1, 2, and 3, are shown attached to one of the two fiber optic connectors 17, while the other three of the six fiber optic cables; 4, 5, and 6, are shown attached to the other fiber optic connector 16. Secondary fiber optic cables 23 and 24 are attached to fiber optic connectors 16 and 17 at one end, and to fiber optic connector 12 at the other end.

The fiber optic connectors suitable for use in the present invention include those disclosed in my copending U.S. patent application Ser. No. 06/ 868,539, filed May 30, 1986 (still pending), which is hereby incorporated by reference.

Dual diametered fiber optic cable 11 is connected from washer 10 to fiber optic connector 12. Fiber optic connector 12 is in turn connected to one end of fiber optic cable 13, the other end of which is attached to the eyepiece, biconcave lens 21 and convex lens 22. The eyepiece may consist of other suitable lenses or other suitable light receiving means.

While the invention has been described in particular, knowledgeable persons will recognize that changes in form and detail may be made without departing from the spirit and scope of the invention.

I claim:

1. A fiber optic telescope comprising at least one fiber optic cell, refracted light conveyor including a lens, a cone, a dual diametered fiber optic cable, a fiber optic connector, a fiber optic cable and an eyepiece or other light receiving means.

2. A fiber optic telescope according to claim 10 further comprising a refracted light retriever including two fiber optic connectors, and two secondary fiber optic cables, such that an image formed by the telescope is capable of being focussed by adjusting the length of any of said fiber optic cables.

* * * * *